United States Patent [19]

Mizutori et al.

[11] Patent Number: 4,967,288
[45] Date of Patent: Oct. 30, 1990

[54] FACSIMILE STORAGE AND EXCHANGE SYSTEM

[75] Inventors: Youichi Mizutori, Tokyo; Takanori Sasaki, Iida, both of Japan

[73] Assignee: Kabushiki Kaisha Toshiba, Kawasaki, Japan

[21] Appl. No.: 187,773

[22] Filed: Apr. 29, 1988

[30] Foreign Application Priority Data

| May 1, 1987 [JP] | Japan | 62-108660 |
| Sep. 28, 1987 [JP] | Japan | 62-240850 |

[51] Int. Cl.⁵ .............................................. H04N 1/32
[52] U.S. Cl. ................................ 358/425; 358/404; 358/435
[58] Field of Search ............... 358/256, 257, 282, 284, 358/400, 425, 434, 435, 436, 438, 439, 444, 447, 464, 404

[56] References Cited

U.S. PATENT DOCUMENTS

| 259,671 | 10/1888 | Mizutori . | |
| 3,824,334 | 7/1974 | Jacobson et al. | 358/439 |
| 4,000,371 | 12/1976 | Ogawa | 358/435 |
| 4,058,672 | 11/1977 | Crager et al. | 358/435 |
| 4,383,277 | 5/1983 | Kubo | 358/256 |
| 4,458,316 | 7/1984 | Fry et al. | 364/200 |
| 4,506,342 | 3/1985 | Yamamoto | 358/903 |
| 4,558,369 | 12/1985 | Shinohara et al. | 358/257 |
| 4,633,387 | 12/1986 | Hartung et al. | 364/300 |
| 4,646,160 | 2/1987 | Iizuka et al. | 358/280 |
| 4,704,636 | 11/1987 | Yano | 358/434 |
| 4,719,514 | 1/1988 | Kurahayashi et al. | 358/404 |
| 4,743,975 | 5/1988 | Ijuin | 358/404 |
| 4,789,900 | 12/1988 | Takahashi | 358/439 |

*Primary Examiner*—James J. Groody
*Assistant Examiner*—Kim-Yen Vu
*Attorney, Agent, or Firm*—Finnegan, Henderson, Farabow, Garrett and Dunner

[57] ABSTRACT

A load distributing apparatus for a facsimile storage and exchange system exchange stored information with other storage and exchange units to balance the quantities of load to be processed by the apparatus and storage and exchange units to thereby perform efficient facsimile communication. Quantities of load to be processed by a plurality of central processing units are balanced among the units to perform efficient facsimile communication.

18 Claims, 6 Drawing Sheets

FACSIMILE STORAGE AND EXCHANGE SYSTEM

BACKGROUND OF THE INVENTION

1. Field of the Invention

This invention relates to a load distributing apparatus for a facsimile storage and exchange system which stores image information from a facsimile unit and transmits the stored image information to a facsimile unit.

2. Description of the Related Art

In a conventional facsimile storage and exchange system, a plurality of storage and exchange units are disposed dispersively at corresponding positions, each of the storage and exchange units having a plurality of facsimile units allocated thereto and supervised thereby. If a facsimile unit transmits image information and destination information for that image information to its storage and exchange unit, the storage and exchange unit receives and stores the image and destination information, and relays the image and destination information to a further storage and exchange unit to which a facsimile unit represented by the destination information is allocated. When the further storage and exchange unit receives and stores the image and destination information, it transmits the image information to the facsimile unit represented by the destination information and supervised by the further storage and exchange unit.

Since the respective storage and exchange units supervise their allocated facsimile units separately, if the respective numbers of facsimile units supervised by the storage and exchange units are unbalanced, the quantities of information communicated among the storage and exchange units will be unbalanced. In order to cope with this situation, each storage and exchange unit is arranged to have slightly more than enough communication lines to process possible congestion with some leeway to thereby adjust the number of facsimile units supervised by that storage and exchange unit. Alternatively, the number of facsimile units supervised may be limited. Since, however, the number of facsimile units supervised by the corresponding storage and exchange unit cannot be changed according to the circumstances, there has been the problem that the quantities of information communicated or the respective loads on the storage and exchange units will be unbalanced. If a problem occurs in one storage and exchange unit, it is difficult for another storage and exchange unit to take over and supervise the facsimile units supervised separately in place of the former defective storage and exchange unit.

On the other hand, a single storage and exchange system may supervise many facsimile units in a concentrated manner. Such a storage and exchange system has, for example, a plurality of central processing units (hereinafter referred to as CPUs) as a control device, each CPU supervising a plurality of allocated facsimile units separately. However, if the respective numbers of facsimile units supervised by the corresponding CPUs are unbalanced, the respective loads on the CPUs will be unbalanced. Thus either each CPU supervises enough communication lines to cope with congestion or the number of facsimile units that may be supervised by one CPU is limited. Thus, problems arise because some of the communication lines are wasted or because the capability of the respective CPUs is not made the best of.

OBJECT AND SUMMARY OF THE INVENTION

It is, therefore, an object of this invention to provide a load distribution apparatus for a facsimile storage and exchange system that balances loads on a plurality of storage and exchange units and that balances loads on a plurality of control devices in one facsimile storage and exchange unit.

In a first aspect of this invention, there is provided a load distributing apparatus for a facsimile storage and exchange system, comprising communication control means for controlling receipt of image information via communication lines; storage means for storing image information; and central processing means for receiving image information from a facsimile unit via the communication control means, storing the received image information into the storage means, and transmitting the stored image information to other facsimile units via the communication control means, wherein the central control means creates supervision information indicative of a quantity of image information load to be processed, exchanges the supervision information with other facsimile storage and exchange units, and exchanges image information with other facsimile storage and exchange units on the basis of the load control information such that the quantities of image information load to be processed by the central processing means and the facsimile storage and exchange units are balanced.

According to the first aspect of this invention, the respective supervision information items are exchanged among at least two facsimile storage and exchange units and image information items are then exchanged among the respective facsimile storage and exchange units such that the quantities of image information load to be processed are balanced among the facsimile storage and exchange units on the basis of those supervising information items. Therefore, the quantity of an image information will not partially be loaded heavily on any particular storage and exchange unit.

In a second aspect of this invention, there is provided a load distributing apparatus for a facsimile storage and exchange system, comprising a plurality of communication control devices corresponding to communication lines, each of the communication control devices being adapted to control receipt of image information via the communicating lines; storage means for storing image information; a plurality of central processing units each allocated to the corresponding communication control devices for storing into the storage means image information received from facsimile units, and transmitting the stored image information to other facsimile units; the apparatus further including a joint memory accessed by the respective central processing units; and switching means for connecting the communication control device selected by a central processing unit to same such that the communication control device is put under supervision of that central processing unit; the respective central processing units creating supervision data for image information and storing the data in the joint memory; and the central processing units calculating the respective quantities of image information load to be processed thereby, and switching the switching means such that the numbers of communication control devices put under supervision of the corresponding central processing units are averaged on the basis of the calculated quantities of image information load and the respective supervision data items stored in the joint memory.

According to the second aspect of this invention, the switching means is switched such that the respective numbers of communication control devices supervised by the CPUs are averaged on the basis of the respective quantities of load to be processed by the CPUs and the supervision data stored in the joint memory. Therefore, the image information load to be processed by one central processing unit will not partially be increased.

In a third aspect of this invention, there is provided a load distributing apparatus for a facsimile storage and exchange system, comprising: communication control means for controlling receipt of image information via communication lines; storage means for storing image information; and a plurality of central processing units for receiving image information from a facsimile unit via the communication control means, storing the received image information into the storage means, and transmitting the stored image information to other facsimile units via the communication control means; wherein the plurality of central processing units calculate the corresponding quantities of image information load to be processed thereby, and exchange image information among the respective central processing units such that the quantities of image information load to be processed are balanced.

According to the third aspect of this invention, the respective quantities of load to be processed by the central processing units are balanced by exchanging image information among the respective CPUs. Therefore, the load on one CPU will not partially be increased.

DESCRIPTION OF THE PREFERRED EMBODIMENTS

Embodiments of this invention will now be described in more detail with reference to the accompanying drawings.

Figure 1:
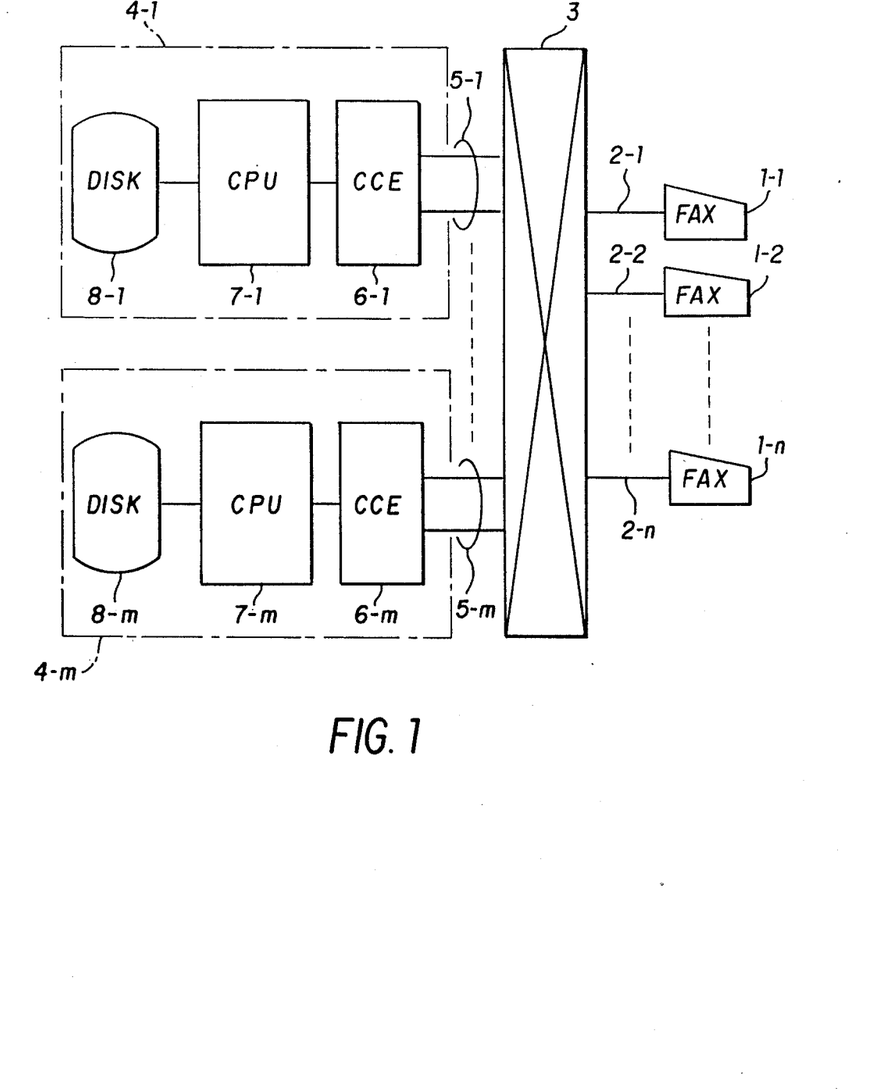
FIG. 1 is a block diagram of a facsimile storage and exchange system including a first embodiment of this invention.

FIG. 1 is a block diagram of a facsimile storage and exchange system including a first embodiment of a load distributing apparatus according to this invention. In this embodiment, a plurality of facsimile units 1-1 to 1-$n$ are connected via communication lines 2-1 to 2-$n$ to a communication network 3. A plurality of storage and exchange units 4-1 to 4-$m$ are connected to communication network 3 via the corresponding communication line groups 5-1 to 5-$m$. Storage and exchange units 4-1 to 4-$m$ include communication control devices (CCEs) 6-1 to 6-$m$ connected to the corresponding communication line groups 5-1 to 5-$m$, central processing units (CPUs) 7-1 to 7-$m$, which control the corresponding storage and exchange units 4-1 to 4-$m$, and storages 8-1 to 8-$m$, such as disks, which store various information items.

Figure 6:
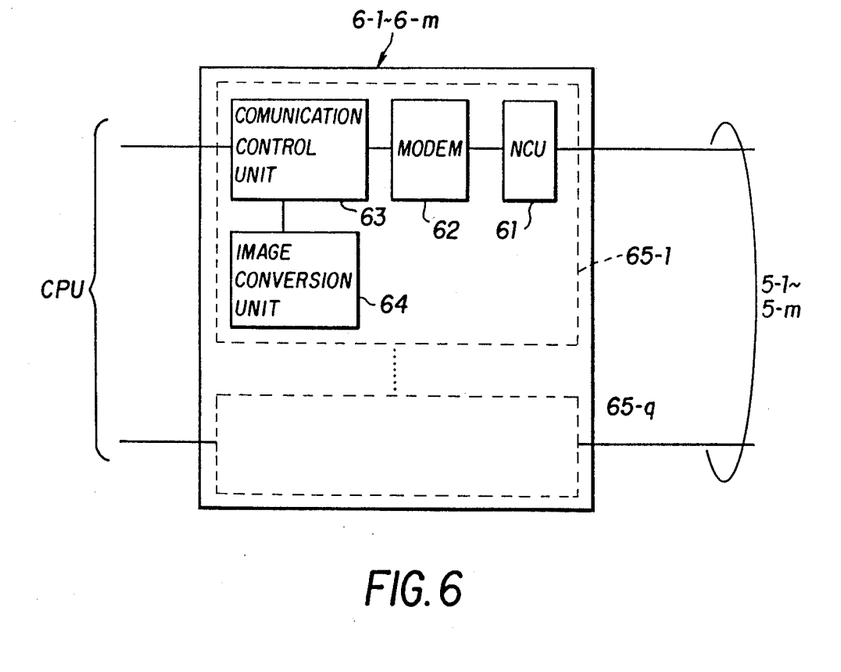
FIG. 6 is a block diagram of a communication control device in a storage and exchange unit.

Each of communication control devices 6-1 to 6-$m$ has a structure, shown in FIG. 6, composed of a plurality of communication units 65-1 to 65-$q$. Each communication unit includes a network control circuit (NCU) 61, a modem 62, a communication control unit 63 and an image conversion unit 64. Network control circuit 61 can be connected to any one of the communication lines of the communication line group to control connection of that line. When modem 62 receives a signal indicative of image information via network control unit 61, the modem demodulates the signal to form image data, which is then transmitted to communication control unit 63. When modem 62 receives image data from communication control unit 63, it modulates the image data to form a signal indicative of image data. The signal is then transmitted to a line via network control circuit 61. Communication control unit 63 executes transmission control procedures, for example, for a G-3 machine obeying CCITT Recommendation with a facsimile unit via network control circuit 61 and modem 62. Network control circuit 61 exchanges image data with modem 62, image conversion unit 64, and the CPU. Image conversion unit 64 compresses and encodes image data receiving from a facsimile unit to provide data having a shortened length to thereby reduce the quantity of image information to be stored. Image conversion unit 64 expands and encodes the image data to adjust the data format to a facsimile unit to which the data is to be transmitted. Image conversion unit 64 reduces or enlarges an image or converts the image line density, as desired. Such a communication unit is provided for each communication line. Thus if a communication control device includes, for example, twelve communication units, it can handle twelve circuit lines.

If, for example, facsimile unit 1-1 calls storage and exchange unit 4-1, they are connected via communication network 3. Facsimile procedure signals are transmitted and received between facsimile unit 1-1 and communication control device 6-1 in storage and exchange unit 4-1. Facsimile unit 1-1 then transmits destination information (a secondary address) and image information. The destination information designates the facsimile to which the image information is to be transmitted.

Unit 4-1 inputs the destination and image information via communication control device 6-1 to CPU 7-1, which then stores the destination and image information items in storage 8-1 in corresponding relationship.

CPU 7-1 reads the destination and image information items from storage 8-1 as needed. If the destination information designates, for example, facsimile unit 1-2, CPU 7-1 calls the destination facsimile 1-2 to which the image information is to be transmitted via control device 6-1 and transmits the image information to facsimile unit 1-2 via communication control device 6-1.

As described above, each of facsimile units 1-1 to 1-$n$ transmits destination and image information items to each of storage exchange units 4-1 to 4-$m$ and the transmitted destination and information items are stored in the respective storages 8-1 to 8-$m$ of storage and exchange units 4-1 to 4-$m$. Each of the storage and exchange units 4-1 to 4-$m$ transmits image information to a facsimile unit designated by the destination information.

Figure 2:
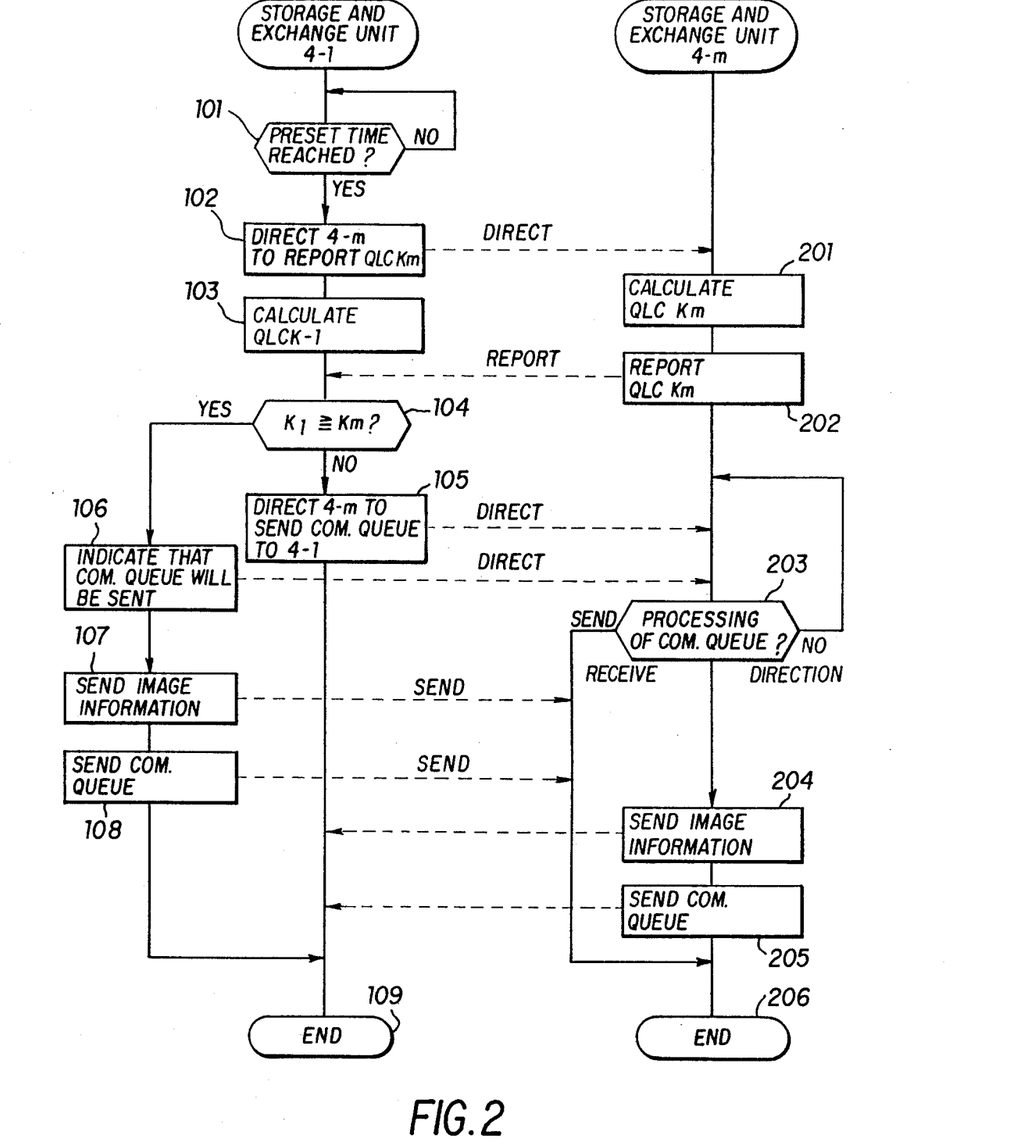
FIG. 2 is a flowchart showing the operation of the system of FIG. 1.

In the described embodiment, in order to eliminate unbalance between quantities of image information to be processed by the respective storage and exchange units, processing according to the flowchart of FIG. 2 is performed.

First, for example, CPU 7-1 of storage and exchange unit 4-1 calls storage and exchange unit 4-m via communication control device 6-1 each time a predetermined preset time is reached (step 101). Thus when storage and exchange units 4-1 and 4-m are connected via communication network 3, CPUs 7-1 and 7-m of storage and exchange units 4-1 and 4-m are capable of transmitting/receiving data therebetween.

When the preset time is reached, CPU 7-1 of storage and exchange unit 4-1 then directs storage and exchange unit 4-m to report to unit 4-1 the quantity of image information load per communication line (hereinafter referred to as the QLC) to be processed by unit 4-m (step 102). CPU 7-1 calculates the QLC to be processed by storage and exchange unit 4-1 in accordance with the following formulas (1) and (2) (step 103). If the quantity of each of the image information items stored as a queue in storage 8-1 of storage and exchange unit 4-1 is a communication quantity, the load on the storage and exchange unit 4-1 will be given by the following formula;

$$\Sigma(\text{communication quantity of an image information item}) \times (\text{frequency of appearances in the queue of the image information item})$$

Namely, the load represented by formula (1) is the sum of communication quantities for image information communicated for each request for communication.

If the communication lines of communication line group 5-1 connected to storage and exchange unit 4-1 are used, the QCL to be processed by storage and exchange unit 4-1 is substantially given by $$K_1 = \Sigma(\text{communication quantity of image information item}) \times (\text{frequency of appearances in the queue of the image information item}) / (\text{the number of communication lines used})$$

When CPU 7-m of storage and exchange unit 4-m is directed to report the QLC to be processed by storage and exchange unit 4-1 at step 102, it calculates QLC km processed by storage and exchange unit 4-m on the basis of formula (2) in the manner of storage and exchange unit 4-1 (step 201). CPU 7-m then reports the calculated QLC km as supervision data to storage and exchange unit 4-1 (step 202).

When CPU 7-1 of storage and exchange unit 4-1 receives the supervision data from storage and exchange unit 4-m, it compares QLC km processed by unit 4-m and represented by the supervision data and QLC $K_1$ processed by unit 4-1 (step 104). If QLC $K_1$ is smaller than km, it is necessary to transfer image and destination information from unit 4-m to unit 4-1 in order to balance the QLCs processed by units 4-1 and 4-m. If the quantity $K_1$ is larger than or equal to the quantity km, it is necessary to transfer image and destination information from unit 4-1 to unit 4-m to balance the QLCs.

For example, if CPU 7-1 of storage and exchange unit 4-1 determines that QLC $K_1$ is smaller than QLC km at step 104, it calculates one half of the difference (km−$K_1$ = Δk) between QLCs $K_1$ and km and directs storage and exchange unit 4-m to send to CPU 7-1 a communication queue including an indication of the quantity of image information corresponding to ($\frac{1}{2}$) Δk (step 105).

CPU 7-m of storage and exchange unit 4-m determines whether it should transmit to storage and exchange unit 4-1 the communication queue on the quantity of image information corresponding to ($\frac{1}{2}$) Δk on the basis of the direction from storage and exchange unit 4-1 (step 203). When CPU 7-m has made this determination it reads the quantity of image information corresponding substantially to ($\frac{1}{2}$) Δk and destination information for that image information from storage 8-m and transmits those information items to storage and exchange unit 4-1 (step 204). CPU 7-m then erases from storage 8-m the read image and destination information items. Thus the quantity of information stored in 8-m decreases by about ($\frac{1}{2}$)Δk and thus the load on storage and exchange unit 4-m is decreased correspondingly. Thereafter, CPU 7-m transmits to storage and exchange unit 4-1 the communication queue on the image information transmitted to storage and exchange unit 4-1 (step 205), and controls communication control device 6-m to open the connection with storage and exchange unit 4-1 via communication network 3 (step 206).

When CPU 7-1 of storage and exchange unit 4-1 receives from storage and exchange unit 4-m image information corresponding substantially to ($\frac{1}{2}$) Δk and the destination information for that image information, it stores in storage 8-1 the image information and destination information in corresponding relationship. In response to the communication queue from storage and exchange unit 4-m, CPU 7-1 causes image information to be transmitted from storage and exchange unit 4-m to the facsimile unit designated by the destination information for the image information. Thus the quantity of information stored in storage 8-1 increases substantially by ($\frac{1}{2}$) Δk where Δk = km−$K_1$ and thus workload on the storage and exchange unit 4-1 increases correspondingly.

As just described above, if QLC $K_1$ to be processed by unit 4-1 is smaller than km to be processed by unit 4-m, one half of the difference Δk=km−$K_1$ between QLCs $K_1$ and km is transferred from unit 4-m to unit 4-1. The QLC processed by storage and exchange unit 4-1 increases to $K_1$ +($\frac{1}{2}$)Δk while the QLC processed by storage and exchange unit 4-m decreases to km−($\frac{1}{2}$)Δk. As a result, the QLCs to be processed by units 4-1 and 4-m become balanced.

If, for example, CPU 7-1 of storage and exchange unit 4-1 determines that QLC $K_1$ to be processed by storage and exchange unit 4-1 is larger than QLC km to be processed by storage and exchange unit 4-m, it calculates one half of the difference ($K_1$−km = Δk) between QLCs $K_1$ and km, and transmits to storage and exchange unit 4-m the indication that it it will send to storage and exchange unit 4-m the communication queue on image information corresponding to the ($\frac{1}{2}$)Δk (step 106). When ($\frac{1}{2}$)Δk is substantially equal to zero, CPU 7-1 does not send to storage and exchange unit 4-m the indication of transmission of the communication queue and controls communication control device 6-1 so as to open the connection with storage and exchange unit 4-m via communication network 3.

When CPU 7-m of storage and exchange unit 4-m receives the indication of transmission of the communication queue from storage and exchange unit 4-m, it waits for the receipt of image information from storage and exchange unit 4-1 (step 203).

When CPU 7-1 of storage and exchange unit 4-1 transmits the indication to storage and exchange unit 4-m at step 106, it reads from storage 8-1 the quantity of image information substantially equal to (½) Δk where (Δk=K$_1$−km) and the destination information for that image information and sends the read information to storage and exchange unit 4-m (step 107). CPU 7-1 then erases from storage 8-1 the read image and destination information and thus the load on storage and exchange unit 4-1 is decreased substantially by (½)Δk. Thereafter, CPU 7-1 transmits to storage and exchange unit 4-m the communication queue on the image information transmitted to device 4-m (step 108) and controls communication control unit 6-1 so as to open the connection with storage and exchange unit 4-m via communication network 3 (step 109).

CPU 7-m of unit 4-m stores in storage 8-m the image information corresponding substantially to (½)Δk and destination information received from storage and exchange unit 4-1. In response to the communication queue from unit 4-1, CPU 7-m causes the image information to be sent from storage and exchange unit 4-1 to a facsimile unit designated by the destination information for that image information. Thus the quantity of information stored in storage 8-m increases substantially by (½) Δk (where Δk=K$_1$−km) and the load on storage and exchange unit 4-m increases.

As described above, when QLC K$_1$ to be processed by storage and exchange unit 4-1 is larger than QLC km to be processed by storage and exchange unit 4-m, one half of the difference (K$_1$−km=Δk) between QLCs K$_1$ and km is transferred from storage and exchange unit 4-1 to 4-m and the QLCs to be processed by the storage and exchange units 4-1 and 4-m are balanced.

At step 202 when storage and exchange unit 4-m sends to unit 4-1 supervision data indicative of QLC km, CPU 7-m of storage and exchange unit 4-m can determine whether storage and exchange unit 4-m is out of order, and transmit to unit 4-1 supervision data containing the result of the determination. For example, if a problem occurs in which the majority of communication lines of the communication line group 5-m for storage and exchange unit 4-m cannot be used, CPU 7-m sends to storage and exchange unit 7-1 supervision data indicative of the contents of the trouble. By that supervision data, CPU 7-1 of unit 4-1 determines the nature of the problem with storage and exchange unit 4-m, namely, that the majority of communication lines of the communication line group 5-m cannot be used, and then directs storage and exchange unit 4-m to transmit to storage and exchange unit 8-1 almost all the information stored in storage 8-m of storage and exchange unit 4-m. CPU 7-m of storage and exchange unit 4-m transmits to storage and exchange unit 4-1 almost all the information stored in storage 8-m in response to the direction from the CPU 7-1. CPU 7-1 of storage and exchange unit 4-1 stores in storage 8-1 the information received from storage and exchange unit 4-m. This means that storage and exchange unit 4-1 can back up storage and exchange unit 4-m.

It is to be noted that the processing illustrated in FIG. 2 is performed between the storage and exchange units 4-1 and 4-m each time a preset time is reached, namely, at predetermined time intervals, to thereby balance the quantities of loads to be processed by the units 4-1 and 4-m. Such balance is kept not only between the units 4-1 and 4-m, but also among other storage and exchange units in predetermined relationship or in random relationship and, as a result, the quantities of load to be processed by all the storage and exchange units are balanced.

Figure 3:
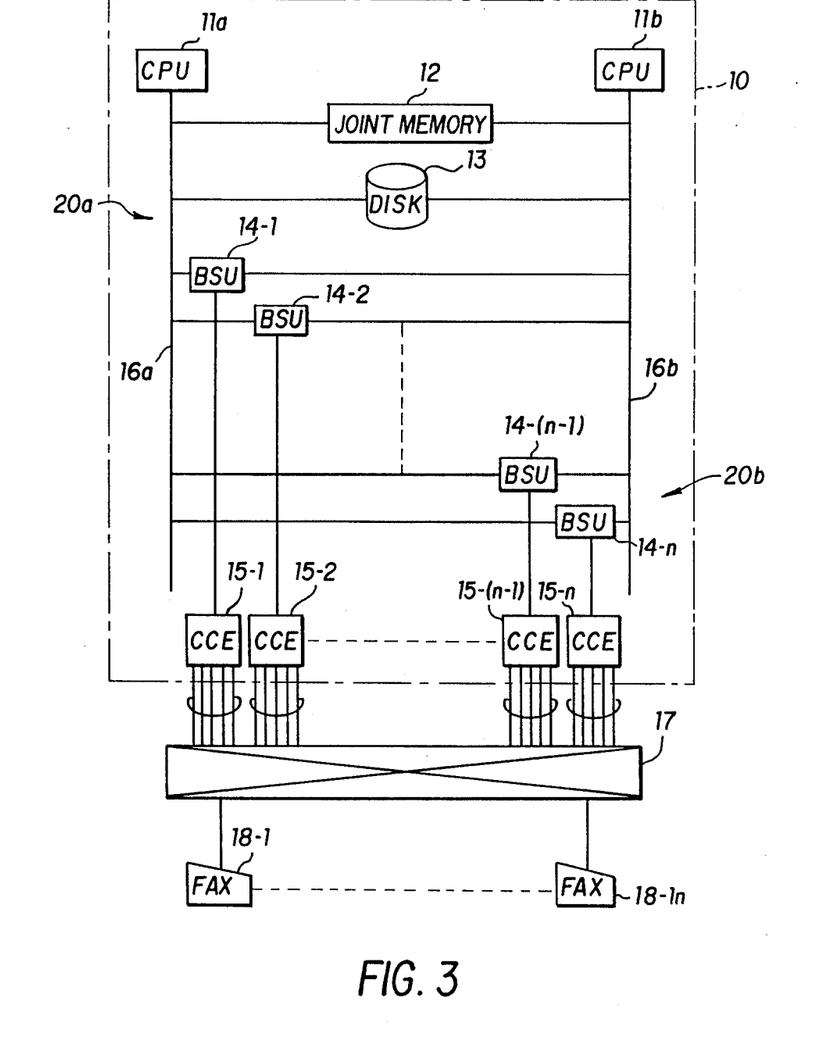
FIG. 3 is a block diagram of a facsimile storage and exchange system involving another embodiment of this invention.

Another embodiment of this invention will now be described. FIG. 3 is a block diagram of a facsimile storage and exchange system involving a second embodiment of a load distributing apparatus according to this invention. The storage and exchange unit 10 is composed of a main processing unit (hereinafter referred to as a main CPU) 11a, which transmits image information to its terminals and controls its terminals, a subsidiary central processing unit (hereinafter referred also to as a sub-CPU) 11b, a joint memory 12 for storing data on the number of communication control devices used for CPUs 11a and 11b and data on the presence/absence of problems in CPUs 11a and 11b written by CPUs 11a and 11b, a storage 13, such as a disk, which stores the image information that CPUs 11a and 11b have received from terminals which they supervise, the communication control devices (CCEs) 15-1 to 15-n corresponding to the communication lines connected to the storage and exchange device for control of the transmission/receipt of image information, bus switching units (BSUs) 14-1 to 14-n which connect the corresponding communication control devices 15-1 to 15-n to a bus for one of CPUs 11a and 11b, and buses 16a and 16b extending from CPUs 11a and 11b, respectively. Each of communication control devices 15-1 to 15-n can be connected to any one of facsimile units 18-1 to 18-m as terminals via communication network 17 to allow transmission/receipt of image information between storage and exchange unit 10 and the respective facsimile units. These communication control devices each have a structure similar to that of the FIG. 6 communication control device. It includes a plurality of communication units each including network circuit 61, modem 62, communication control unit 63 and image conversion unit 64.

The operation of storage and exchange unit 10 will now be described. For example, if facsimile unit 18-1 calls a communication line connected to communication control device 15-1 of storage and exchange unit 10 and connected to that communication line, facsimile unit 18-1 first transmits destination information (a secondary address), and then image information to communication control device 15-1. Communication control device 15-1 has been connected via bus switching unit 14-1 to one of buses 16a and 16b for CPU 11a and 11b. If, for example communication control device 15-1 is connected to bus 16a for main CPU 11a, then destination information and subsequent image information from facsimile unit 18-1 and received by communication control device 15-1 are sent to main CPU 11a. Main CPU 11a analyses the received destination information and forms a destination list which is then stored in storage 13 together with image information received next. At that time, main CPU 11a writes into joint memory 12 data on communication control device 15-1 used at present for transmission/receipt of image information and data on the normality/abnormality of CPU 11a. Those operations apply to sub-CPU 11b. For example, when sub-CPU 11b is transmitting /receiving image information via communication control device 15-1, it writes into joint memory 12 data on communication control devices 15-1 used at present for transmission/receipt of image information and data on the normality/abnormality of sub-CPU 11b. In summary, numbers of the communication control devices supervised at present by CPUs 11a and 11b and the normality/abnormality of CPUs 11a and 11b are written into joint memory 12.

As described above, in storage and exchange unit 10, CPUs 11a and 11b allocate thereto and supervise communication control devices 15-1 to 15-n separately. Thus storage and exchange unit 10 can be said to have a composite structure of a first and a second storage and exchange subunits 20a and 20b which represent the systems of CPUs 11a and 11b, respectively.

Figure 4:
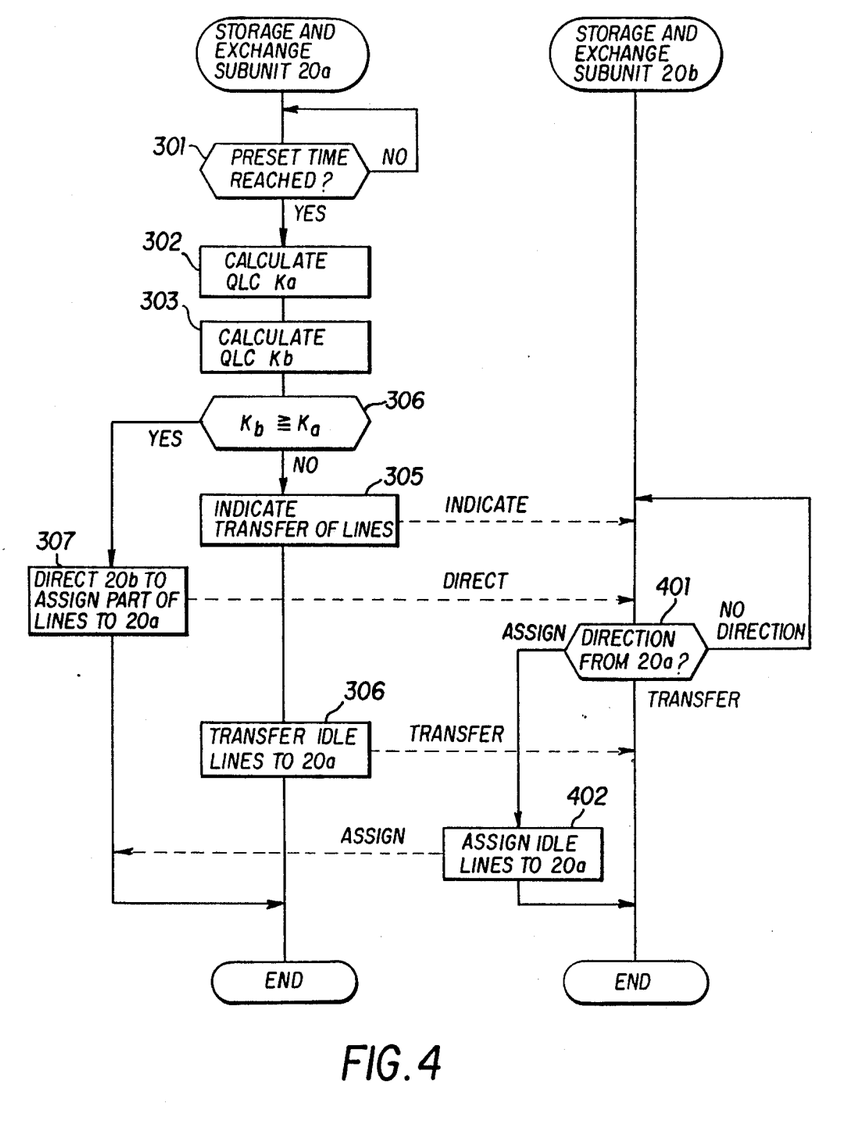
FIG. 4 is a flowchart showing the operation of the system of FIG. 3.

This embodiment eliminates unbalance between QLCs to be processed by first and second storage and exchange subunits 20a and 20b by performing the processing shown by the flowchart of FIG. 4.

First, for example, when a predetermined preset time is reached (step 301), main CPU 11a of first storage and exchange subunit 20a retrieves from storage 13 all the image and destination information items supervised at present by CPU 11a and reads from joint memory 12 the number of the communication control devices supervised at present by CPU 11a. CPU 11a calculates QLC Ka to be processed by first storage and exchange subunit 20a from the communicated quantities of different image information items and the frequency of appearances of the same information item as each image information item in a communication queue that CPU 11a supervises at present, and the number of communication lines used corresponding to the number of the communication control devices on the basis of the above formula (2). CPU 11a then writes that calculated QLC Ka into joint memory 12 (step 302). Main CPU 11a retrieves from storage 13 all the image and destination information that sub-CPU 11b supervises at present, and reads from joint memory 12 the number of the communication control devices that sub-CPU 11b supervises at present. Main CPU 11a calculates QLC Kb to be processed by second storage and exchange subunit 20b from the communicated quantities of different image information items, the frequency of appearances of the same information item as each image information in a communication queue under supervision of sub-CPU 11b and the number of the communication lines used corresponding to the number of the communication control devices under supervision of sub-CPU 11b on the basis of the above formula (2), and writes the calculated QLC Kb into joint memory 12 (step 303).

Main CPU 11a then compares QLCs Ka and Kb processed by first and second storage and exchange subunits 20a and 20b, respectively (step 304). If the quantity Ka is larger than the quantity Kb, main CPU 11a indicates that part of the communication control devices which main CPU 11a supervises at present will be transferred to sub-CPU 11b (step 305). When sub-CPU 11b receives this indication (step 401), it waits for the transfer of that part of the communication control devices.

Main CPU 11a selects unused ones of the communication control device's, the information on which is stored in joint memory 12 and supervised by CPU 11a at present, and controls bus switching unit 14-2 such that the selected communication control device, for example, communication control device 15 2, is switched from bus 16a to 16b (step 306). Thus communication control device 15-2 is transferred from main CPU 11a to sub-CPU 11b and placed under supervision of sub-CPU 11b. It is to be noted that as the difference between QLCs Ka and Kb to be processed by first and second storage and exchange subunits 20a and 20b is large, the number of communication control devices transferred from main CPU 11a to sub-CPU 11b is large. Therefore, the number of communication control devices under supervision of main CPU 11a decreases while the number of communication control devices under supervision of sub-CPU 11b increases. As a result, the QLC to be processed by first storage and exchange subunit 20a increases while the QLC to be processed by second storage and exchange subunit 20b decreases, so that the QLCs to be processed by first and second storage and exchange subunits 20a and 20b are balanced.

If QLC Kb is larger than or equal to Ka at step 304, main CPU 11a directs sub-CPU 11b to assign main CPU 11a part of the communication control devices under supervision of sub-CPU 11b (step 307). Thereafter, main CPU 11a waits for the assignment of part of the communication control devices from sub-CPU 11b to main CPU 11a.

When sub-CPU 11b receives an indication of assignment of the communication control device from main CPU 11a (step 401), it select unused ones of the communication control devices, the data on which is stored in joint memory 12 and supervised at present by sub-CPU CPU 11b. Sub-CPU controls bus switching unit 14-n such that the selected communication control device, for example, 15-n, is switched from bus 16b to bus 16a (step 402). Thus communication control device 15-n is assigned from sub-CPU 11b to main CPU 11a and placed under supervision of main CPU 11a. It is to be noted that as the difference between QLCs Ka and Kb to be processed by first and second storage and exchange subunits 20a and 20b is large, the number of the communication control devices assigned from sub-CPU 11b to main CPU 11a is large. Accordingly, the number of the communication control devices under supervision of sub-CPU 11b decreases while the number of the communication control devices under supervision of main CPU 11a increases to thereby balance the QLCs to be processed by first and second storage and exchange subunits 20a and 20b.

In this way, if there is unbalance between the QLCs to be processed by main and sub-CPUs 11a and 11b, bus switching units 14-1 to 14-n are switched so as to redistribute communication control devices supervised by the respective CPUs to adjust the unbalance. For example, if a situation in which main CPU 11a supervises 80% of all the communication control devices, the QLC to be processed by main CPU 11a is excessive, so that communication control devices 15-1 to 15-n are redistributed such that, for example, main CPU 11a supervises 60% of all the communication control devices while sub-CPU 11b supervises the remaining 40% of all the communication control devices. Thus one CPU is prevented from processing an excessively large quantity of communications so that the QLCs to be processed by first and second storage and exchange subunits 20a and 20b are balanced. Thereafter, main CPU 11a reads from storage 13 image information and the address list, and calls a facsimile unit, for example, 18-m, designated by the destination information described in the address list via a communication control device, for example, 15-n, connected to bus 16a at this time. Thus main CPU 11a is connected to facsimile unit 18-m via communication control device 15-n and communication network 17, and transmits to facsimile unit 18-m the image information read from storage 13.

When main CPU 11a retrieves joint memory 12 at predetermined times or at time intervals and knows that, for example, sub-CPU 11b, is out of order, main CPU 11a immediately controls the respective bus switching units 14-1 to 14-n so that all the communication control units 15-1 to 15-n are connected to bus 16a of main CPU 11a. As a result, main CPU 11a backs up sub-CPU 11b.

In the case of a structure in which three or more storage and exchange subunits supervised by three or more CPUs are incorporated, any particular one of all the CPUs may be designated as a main CPU. The other CPUs are designated as sub-CPUs, and the main CPU can perform the processing illustrated FIG. 4 with the respective sub-CPUs to thereby balance the QLCs to be processed by the respective storage and exchange subunits.

Figure 5:
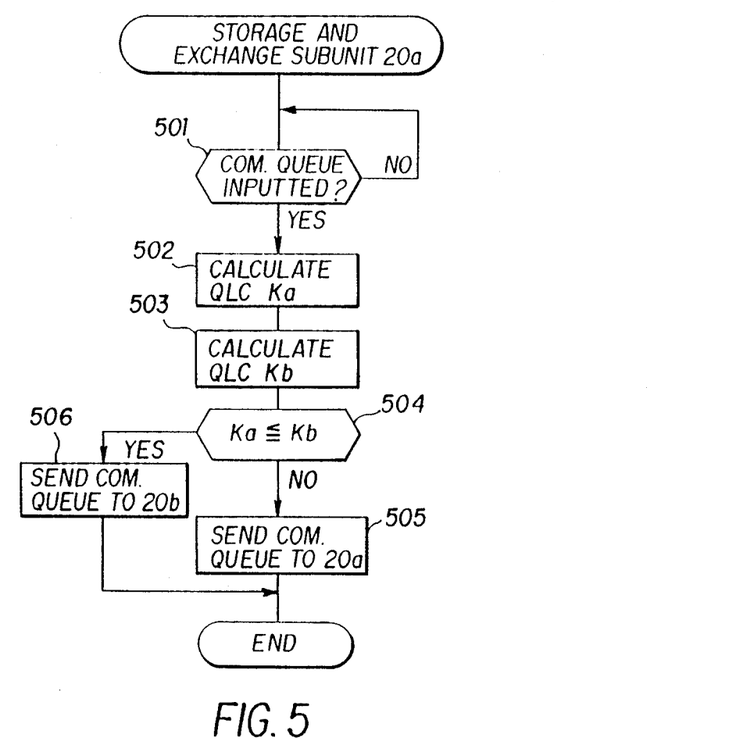
FIG. 5 is a flowchart showing the operation of still another embodiment of this invention.

FIG. 5 is a flowchart showing a further embodiment of a load distribution system according to this invention. This flowchart can be carried out in the facsimile storage and exchange system of FIG. 3.

First, when main CPU 11a of first storage and exchange subunit 20a receives from a facsimile unit image information and the destination information for that image information via a communication control device (step 501), main CPU 11a retrieves from storage 13 all the image and destination information items which it supervises at present and reads from joint memory 12 the number of the communication control devices which CPU 11a supervises at present. Main CPU 11a calculates QLC Ka to be processed by first storage and exchange subunit 20a from the communicated quantities of different image information items, the frequency of appearances of the same information item as each image information item in a communication queue that CPU 11a supervises at present, and the number of communication lines used corresponding to the read number of communication control devices on the basis of the above formula (2) and writes the calculated QLC Ka into joint memory 12 (step 502). Main CPU 11a retrieves from storage 13 all the image information and destination information for all the image information which sub-CPU 11b supervises, and reads from joint memory 12 the number of communication control devices that sub-CPU 11b supervises. Main CPU 11a calculates QLC Kb to be processed by second storage and exchange subunit 20b from the communicated quantities of different image information items, the frequency of appearances of the same information item as each image information item in a communication queue which CPU 11b supervises at present, and the number of the communication lines used corresponding to the read number of the communication control devices on the basis of the above formula (2) and writes QLC Kb into joint memory 12 (step 503).

Main CPU 11a then compares QLCs Ka and Kb to be processed by first and second storage and exchange subunit 20a and 20b (step 504). If Ka is larger than Kb, main CPU 11a delivers to sub-CPU 11b the image information and destination information for that image information received newly at step 501 (step 505). Sub-CPU 11b analyzes the received destination information and frames a address list, and stores in storage 13 the address list and received image information as the supervised information.

Namely, if QLC Ka is larger than QLC Kb, main CPU 11a delivers the image information and destination information to sub-CPU 11b, so that the QLC to be processed by first storage and exchange subunit 20a remains unchanged while the QLC to be processed by second storage and exchange subunit 20b increases. As a result, the QLCs processed by first and second storage and exchange subunits 20a and 20b are balanced.

If QLC Kb is larger than or equal to QLC Ka at step 504, main CPU 11a itself supervises the image information and destination information newly received at step 501 (step 506). Thus, main CPU 11a frames an address list from the received destination information, and stores into storage 13 the address list as well as the image information as the supervised information.

Namely, if QLC to be processed Kb is larger than or equal to QLC Ka, main CPU 11a itself supervises the newly received image information and destination information, so that QLC to be processed by first storage and exchange subunit 20a increases while the QLC to be processed by second storage and exchange subunit 20b remains unchanged. As a result, the QLCs to be processed by first and second storage and exchange subunits 20a and 20b are balanced.

While the particular embodiments illustrate the processing performed when the image and destination information is received from a facsimile unit, this invention is not limited to those particular embodiments. Even when first and second storage and exchange subunits 20a and 20b transmit image information to other terminals, this information may be handled as a communication queue to perform the processing shown in FIG. 5 to thereby balance the QLCs to be processed by first and second storage and exchange subunits 20a and 20b.

As described above, main CPU 11a determines which of the QLCs to be processed by main and sub-CPU 11a and 11b is larger for each communication queue and supervises the communication queue using the CPU which handles the smaller QLC to be processed. Therefore, the QLCs to be processed by first and second storage and exchange subunits 20a and 20b are invariably balanced.

When main CPU 11a retrieves joint memory 12 for each communication queue and recognizes that, for example, sub-CPU 11b, is out of order, main CPU 11a immediately takes over and supervises all the communication queues by itself. As a result, sub-CPU 11b is backed up by main CPU 11a.

If a storage and exchange system is composed of three or more storage and exchange units that are supervised by three or more CPUs, any particular one of the CPUs is designated as a main CPU and the other CPUs became sub-CPUs. The QLCs to be processed by the storage and exchange units are balanced when the main CPU executes the processing shown in FIG. 5 with the respective sub-CPUs.

The facsimile storage and exchange unit 10 of FIG. 3 may be used as the facsimile storage and exchange units in the FIG. 1 system. In that case, the main CPU 11a in the facsimile storage and exchange unit 10 may perform in a parallel manner the respective processing operations illustrated in FIGS. 2, 4, and 5. Such arrangement serves to further efficiently balance the QLCs to be processed by the system and facsimile storage and exchange units to thereby realize very efficient facsimile communication.

What is claimed is:

1. A load distributing apparatus for a facsimile storage and exchange system comprising:
   a plurality of facsimile units, each connected to respective ones of first lines, for transmitting and receiving information through said first lines;
   a plurality of facsimile storage and exchange units, each including:

a communication control means connected to a plurality of second lines, for receiving image information and address information from one of said plurality of facsimile units through one of said second lines, and for transmitting said image information to at least another one of said facsimile units designated by said address information, storage means for storing said received image and address information until said received image information is transmitted, and a central control means for controlling said communication control means and said storage means; and a communication exchange network for connecting said first lines to said second lines so as to enable transmission and reception of information between said facsimile units and said facsimile storage and exchange units, and for interconnecting said second lines so as to enable transmission and reception among said facsimile storage and exchange units;

wherein said central control means includes:

means for calculating a quantity of image information load to be processed in connection with communication of said image information stored in said storage means, means for generating supervision information indicative of the quantity of image information load to be processed, for transmitting said supervision information generated at the facsimile storage and exchange unit containing the generating means via said communication exchange network to another facsimile storage and exchange unit and for receiving supervision information generated at said another facsimile storage and exchange unit via said communication exchange network, and means for exchanging means information and address information among said facsimile storage and exchange units via said communication exchange network so that the quantity of image information load to be processed indicated by said supervision information for each of said facsimile storage and exchange units may be balanced.

2. A load distributing apparatus according to claim 1, wherein the quantity of image information load to be processed is calculated as $\Sigma$ (the communicated quantity of image information items)$\times$(the frequency of appearances of the information items in a communication queue supervised by the central processing means)/(the number of communication lines used).

3. A load distributing apparatus for a facsimile storage and exchange system according to claim 1 wherein said central control means further includes:

means for causing, when said facsimile storage and exchange unit is out of order, information indicative of the out-of-order status of the facsimile storage and exchange unit to be included in said supervision information; and means for transferring, safer completion of transmission of said supervision information from said communication control means to said another facsimile storage and exchange unit via said communication exchange network, said image information and address information stored after the completion of the transmission in said storage means from said storage means via said communication network to said another facsimile storage and exchange unit.

4. A load distributing apparatus for a facsimile storage and exchange system according to claim 1 wherein each of said facsimile exchange and storage units includes:

a joint memory for storing data; and switching means for distributing said communication control units and for connecting said distributed communication control units to each of said central processing units, wherein said communication control means includes a plurality of communication control units connected to said communication exchange network vai said second lines, and wherein said central control means includes a main central processing unit and at least one sub central processing unit, for distributing image information and address information stored in said storage means, and for supervising said distributed image information and address information, said main and sub central processing units each including means for preparing supervision data indicative of the number of said communication control units that are put under the control of each of said central processing units when connected to said communication control units via said switching means and for storing the supervision data in said joint memory, said main control processing unit including means for calculating ht quantity of image information load to be processed of the main central processing unit based on the number of lines corresponding to the number of said communication control units under the control of said main central processing unit, the number of said communication control units indicated by said supervision data, and on a communication quantity of said image information and address information under the control of said main central processing unit, said image information being stored in said storage means, and for calculating the quantity of image information load to be processed of the sub central processing unit based on the number of lines corresponding to the number o said communication control units under the control of the sub central processing unit, said number of said communication control units being indicated by said supervision data, and on said image information and address information stored in said storage means under the control of the sub central processing unit, and means for redistributing said communication control units to each of said central processing units by switching said switching means of that the quantity of image information load to be processed of said main central processing unit and that of said sub central processing unit may be balanced.

5. A load distributing apparatus for a facsimile storage and exchange system according to claim 4 wherein each of said central processing units includes:

means for causing, when one central processing unit is out of order, information indicative of the out-of-order status of said one central processing unit to be included in the supervision data; and means for putting, when the out-of-order status of the another processing unit is shown by said supervision data stored in said joint member, communication control units under the control of said another central processing unit under the control of said central processing unit containing the putting means by switching h switching means.

6. A load distributing apparatus according to claim 4, wherein the quantity of image information load to be processed is calculated as Σ(the communicated quantity of image information items)×(the frequency of appearance of the information items in a communication queue supervised by the central processing means)/(he number of communication lines used).

7. A load distributing apparatus for a facsimile storage and exchange system according to claim 1 wherein each of said facsimile exchange and storage units includes:
   a joint memory for storing data; and
   wherein said communication control means includes a plurality of communication control units connected to said communication exchange network via said second lines, and
   wherein said central control means includes a main central processing unit and at least one sub central processing unit, for distributing image information and address information stored in said storage means, and for supervising said distributed image information and address information, as well as for distributing said communication control units and supervising said distributed communication control units,
   said main and subs central processing units each including means for preparing supervision data indicative of the number of said communication control units that are put under the control of each of said central processing units when connected to said communication control units via said switching means in for storing the supervision data in said joint memory,
   said main central processing unit including:
      means for calculating the quantity of image information load to be processed of the main central processing unit based on the number of lines corresponding to the number of said communication control units under the control of said main central processing unit, the number of said communication control units indicated by said supervision data, and on a communication quantity of said image information and address information under the control of said main central processing unit, said image information being stored in said storage means, and for calculating the quantity of image information load to be processed of the sub central processing unit based on the number of lines corresponding to the number of said communication control units under the control of the sub central processing unit, said number of said communication control units being indicated by said supervision data, and on said image information and address information stored in said storage means under the control of the sub central processing unit, and
      means for redistributing image information and address information stored in said storage means to each of said central processing units so that the quantity of image information load to be processed of said main central processing unit and that of said sub central processing unit may be balanced.

8. A load distributing apparatus for a facsimile storage and exchange system according to claim 7 wherein each of said central processing units includes:
   means for causing, when one central processing unit is out of order, information indicative of the out-of-order status of said one central processing unit to be included in the supervision data; and
   means for putting , when the out-of-order status of another processing unit is shown by said supervision data stored in said joint memory, all of said image information and address information stored in said storage means under the control of said central processing unit containing the putting means.

9. A load distributing apparatus according to claim 7, wherein the quantity of image information load to be processed is calculated as Σ(the communicated quantity of image information items)×(the frequency of appearances of the information items in a communication queue supervised by the central processing means)/(the number of communication lines used).

10. A load distributing apparatus for a facsimile storage and exchange system comprising:
   a plurality of facsimile units, connected to respective ones of first lines, for transmitting and receiving information through said first lines;
   a facsimile storage and exchange unit including:
      a plurality of communication control units connected to a plurality of second lines, for receiving image information and address information from one of said plurality of facsimile units through one of said second lines, and for transmitting said image information to at least one of another facsimile units designated by said address information,
      storage means for storing said received image and address information until said received image information is transmitted,
      a joint memory for storing data, and
      a main central processing unit and at least one sub central processing unit, for distributing image information and address information stored in said storage means, and for supervising said distributed image information and address information, as well as for distributing said communication control units and supervising said distributed communication control units, and switching means for connecting said distributed communication control units to each of said central processing units; and
   a communication exchange network for connecting said first lines to said second lines so as to enable transmission and reception of information between said facsimile units and said facsimile storage and exchange unit;
   said main and sub central processing units each including means for preparing supervision data indicative of the number of said communication control units that are put under the control of each of said central processing units when connected to said communication control units via said switching means and for storing the supervision data in said joint memory,
   said main central processing unit including:
      means for calculating the quantity of image information load to be processed of the main central processing unit based on the number f lines corresponding 5° the number of said communication control units under the control of said main central processing unit, the number of said communication control units indicated by said supervision data, and on a communication quantity of said image information and address information under the control of said main central processing unit, said image information being stored in said storage means, and for calculating the quantity of image information load to be processed of the sub central processing unit based on the number of lines corresponding to the number of said communication control units under the control of the sub central processing unit, said number of said communication control units being indicated by said supervision data, and on said image information and address information stored in said storage means under the control of the sub central processing unit, and means for redistributing said communication control units to each of said central processing units by switching said switching means so that the quantity of image information load to be processed of said main central processing unit and that of said sub central processing unit may be balanced.

11. A load distributing apparatus for a facsimile storage and exchange system according to claim 10 wherein each of said central processing units includes:

means for causing, when one central processing unit is out of order, information indicative of the out-of-order status of said cone central processing unit to be included in the supervision data; and means for putting, when the out-of-order status of the another processing unit is shown by said supervision data stored in said joint memory, communication control units under the control of said another central processing unit under the control of said central processing unit containing the putting means by switching the switching means.

12. A load distributing apparatus for a facsimile storage and exchange system according to claim 10 wherein said main central processing unit includes:

means for redistributing image information and address information stored in said storage means to each of said central processing units to that the quantity of image information load to be processed of said main central processing unit and that of said sub central processing unit may be balanced.

13. A load distributing apparatus according to claim 12, wherein the quantity of image information load to be processed is calculated as Σ(the communicated quantity of image information items)×(the frequency of appearances of the information items in a communication queue supervised by the central control unit)/(the number of communication lines used).

14. A load distributing apparatus for a facsimile storage and exchange system according to claim 10 wherein each of said central processing units includes:

means or causing, when one central processing unit is out of order, information indicative of the out-of-order status of said one central processing unit to be included in the supervision data; and means for putting, when the out-of-order status of another processing unit is shown by said supervision data stored in said joint memory, all of said image information and address information stored in said storage means under control of said central processing unit containing the putting means.

15. A load distributing apparatus according to claim 10, wherein the quantity of image information load to be processed is calculated as Σ(the communicated quantity of image information items)×(the frequency of appearance of the information items in a communication queue supervised by the central control unit)/(the number of communication lines used).

16. A load distributing apparatus for a facsimile storage and exchange system comprising:

a plurality of facsimile units, connected to respective ones of first lines, for transmitting and receiving information through said first lines;

a facsimile storage and exchange unit including:

a plurality of communication control units connected to a plurality of second lines, for receiving image information and address information from one of said plurality of facsimile units through one of said second lines, and for transmitting said image information to at least one of another facsimile units designated by said address information, storage means for storing said received image and address information until said received image information is transmitted, a joint memory for storing data, and a main central processing unit and at least one sub central processing unit, for distributing image information and address information stored in said storage means, and for supervising said distributed image information and address information, as well as for distributing said communication control units and supervising said distributed communication control units; and a communication exchange network for connecting said first lines to said second lines so as to enable transmission and reception of information between said facsimile units and said facsimile storage and exchange unit;

said main and sub central processing units each including means for preparing supervision data indicative of the number of said communication control units that are put under the control of each of said central processing units and for storing the supervision data in said joint memory, said main central processing unit including:

means or calculating the quantity of image information load to be processed of the main central processing unit based on the number of lines corresponding to the number of said communication control units under the control of said main central processing unit, the number of said communication control units indicated by said supervision data, and on a communication quantity of said image information and address information under the control of said main central processing unit, said image information being stored in said storage means, and for calculating the quantity of image information load to be processed of the sub central processing unit based on the number of lines corresponding to the number of said communication control units under the control of the sub central processing unit, said number of said communication control units being indicated by said supervision data, and on said image information and address information stored in said storage means under the control of the sub central processing unit, and means for redistributing image information and address information stored in said storage means to each of said central processing units so that ht quantity of image information load to be processed of said main central processing unit and that of said sub central processing unit may be balanced.

17. A load distributing apparatus for a facsimile storage and exchange system according to claim 16 wherein each of said central processing units includes:
    means for causing, when one central processing unit is out of order, information indicative of the out-of-order status of said one central processing unit to be included in the supervision data; and
    means for putting, when the out-of-order status of another processing unit is shown by said supervision data stored in said joint memory all of said image information and address information stored in said storage means under the control of said central processing unit containing the putting means.

18. A load distributing apparatus according to claim 16, wherein the quantity of image information load to be processed is calculated as $\Sigma$(the communicated quantity of image information items)$\times$(the frequency of appearances of the information items in a communication queue supervised by the central control unit)/(the number of communication lines used).

* * * * *